United States Patent
Shields et al.

(10) Patent No.: US 11,958,237 B2
(45) Date of Patent: Apr. 16, 2024

(54) 3D PRINTING SYSTEM FOR PREPARING A THREE-DIMENSIONAL OBJECT WITH A SURFACE MELTING SECTION

(71) Applicant: Sulzer Management AG, Winterthur (CH)

(72) Inventors: Stephen Shields, The Woodlands, TX (US); Daniele Tammaro, Zürich (CH); Ulla Trommsdorff, Zürich (CH); Claudio Walker, Winterthur (CH)

(73) Assignee: SULZER MANAGEMENT AG, Winterthur (CH)

( * ) Notice: Subject to any disclaimer, the term of this patent is extended or adjusted under 35 U.S.C. 154(b) by 0 days.

(21) Appl. No.: 17/270,194

(22) PCT Filed: Aug. 21, 2019

(86) PCT No.: PCT/EP2019/072391
§ 371 (c)(1),
(2) Date: Feb. 22, 2021

(87) PCT Pub. No.: WO2020/043571
PCT Pub. Date: Mar. 5, 2020

(65) Prior Publication Data
US 2021/0308939 A1 Oct. 7, 2021

(30) Foreign Application Priority Data

Aug. 30, 2018 (EP) .................................. 18191758

(51) Int. Cl.
| | | |
|---|---|---|
| *B29C 64/118* | (2017.01) | |
| *B29C 64/209* | (2017.01) | |
| *B29C 64/321* | (2017.01) | |
| *B29K 101/12* | (2006.01) | |
| *B29K 105/04* | (2006.01) | |
| *B33Y 10/00* | (2015.01) | |
| *B33Y 30/00* | (2015.01) | |
| *B33Y 40/00* | (2020.01) | |

(52) U.S. Cl.
CPC .......... *B29C 64/118* (2017.08); *B29C 64/209* (2017.08); *B29C 64/321* (2017.08); *B33Y 10/00* (2014.12); *B33Y 30/00* (2014.12); *B33Y 40/00* (2014.12); *B29K 2101/12* (2013.01); *B29K 2105/04* (2013.01); *B29K 2995/0039* (2013.01); *B29K 2995/004* (2013.01)

(58) Field of Classification Search
CPC .............. B29C 64/118; B29K 2101/12; B29K 2995/0039; B29K 2995/004
See application file for complete search history.

(56) References Cited

U.S. PATENT DOCUMENTS

| | | | | |
|---|---|---|---|---|
| 5,340,433 A | * | 8/1994 | Crump ................... | G05B 19/41 156/218 |
| 2009/0263582 A1 | * | 10/2009 | Batchelder .............. | C22C 43/00 427/256 |
| 2013/0337256 A1 | * | 12/2013 | Farmer .................. | B33Y 70/00 428/371 |
| 2016/0347000 A1 | * | 12/2016 | Kerrigan ............... | B29C 48/288 |
| 2017/0129178 A1 | * | 5/2017 | Waatti ................... | B29C 48/266 |
| 2017/0266885 A1 | | 9/2017 | Gifford et al. | |
| 2017/0274585 A1 | | 9/2017 | Armijo et al. | |
| 2017/0368758 A1 | | 12/2017 | Touma | |
| 2018/0141274 A1 | * | 5/2018 | Fink ...................... | H01B 7/0233 |
| 2021/0039399 A1 | * | 2/2021 | Busbee ................. | B29C 64/209 |

FOREIGN PATENT DOCUMENTS

| | | |
|---|---|---|
| CN | 106493968 A | 3/2017 |
| DE | 10 2016 207309 A1 | 11/2017 |
| EP | 3 243 633 A1 | 11/2017 |

OTHER PUBLICATIONS

Extended European Search Report dated Mar. 28, 2019 in corresponding European Patent Application No. 18191758.4, filed Aug. 30, 2018.
International Search Report and Written Opinion dated Nov. 15, 2019 in corresponding International Patent Application No. PCT/EP2019/072391, filed Aug. 21, 2019.
International Preliminary Report on Patentability dated Mar. 2, 2021 in corresponding International Patent Application No. PCT/EP2019/072391, filed Aug. 21, 2019.

* cited by examiner

Primary Examiner — Timothy Kennedy
Assistant Examiner — Ariella Machness
(74) Attorney, Agent, or Firm — GLOBAL IP COUNSELORS, LLP

(57) ABSTRACT

A three-dimensional (3D) printing system for preparing an object made at least partially of an expanded polymer including: a printing device for transporting and depositing a strand of expanded polymer including a blowing agent onto a surface and a 3D movement device for adjusting the position of the printing device in a predefined matrix allowing deposit of the strand of expanded polymer at a predetermined time and precise position within the matrix, the printing device includes: a feed section, a transporting section, a surface melting section, and a terminal printing head section for depositing the expanded polymer strand onto the surface, and all of sections have the same inner diameter, and the surface melting section including a solid-state welding element, a laser beam, a generator of hot gas or liquid and/or a generator of heat.

1 Claim, No Drawings

3D PRINTING SYSTEM FOR PREPARING A THREE-DIMENSIONAL OBJECT WITH A SURFACE MELTING SECTION

CROSS-REFERENCE TO RELATED APPLICATIONS

This application is a U.S. National Stage application of International Application No. PCT/EP2019/072391, filed Aug. 21, 2019, which claims priority to European Patent Application No. 18191758.4, filed Aug. 30, 2018, the contents of each of which are hereby incorporated herein by reference.

BACKGROUND

Field of the Invention

The present invention relates to a three-dimensional printing system for preparing a three-dimensional object made at least partially of an expanded polymer, such as of polystyrene foam, as well as to a method for preparing a three-dimensional object made at least partially of an expanded polymer.

Background Information

Expanded polymers, i.e. polymer foams, are cellular structures, which generally have a low density. Foams are divided in closed-cell foams, open-cell foams, mixed-cellular foams and integral foams. While closed-cell foams comprise cells, which are completely surrounded by the solid polymer material and which are filled with gas, the cells of open-cell foams are not completely surrounded by the solid polymer material and thus interconnected with each other. Due to this, open-cell foams can absorb liquid, such as water, whereas closed-cell foams do not. Mixed-cellular foams comprise open-cells as well as closed-cells, whereas integral foams have thick, non-cellular or at least essentially non-cellular outer walls and therebetween a cellular core, wherein the density reduces from the outer walls to the inner core essentially continuously.

Foams are easily formable, have a low tensile strength, have a high acoustic insulation property and furthermore have a low thermal conductivity. Due to these properties, foams are easily workable and are applied in various commercial areas. For instance, closed-cell foams, such as those made of polystyrene or polyurethane, are used as thermal insulating materials in a plurality of sectors of industry, such as e.g. as building insulation materials. Other examples for the commercial application of foams are acoustic insulating materials, cushioning, mattresses, mats and sponges.

Foams can be made of nearly all commercially available polymers, such as of ethylene-vinyl acetate, of polyethylene, of nitrile rubber, of a copolymer of acrylonitrile and butadiene, of polychloroprene, of polyimide, of polyester, of polypropylene, of polystyrene, of polyurethane, of polylactic acid and of polyvinyl chloride.

Several conventional methods for producing foam articles are known. One example therefore is the direct injection expanded foam molding process, in which a pressurized polymer melt including a blowing agent is injected through nozzles into a mold. In the mold, in which a lower pressure is present than the pressure of the pressurized polymer melt, the blowing agent expands, thus forming the polymer foam in the desired shape. Another example is to incubate polymer granulates in an autoclave at an elevated temperature and under pressure with a blowing agent, such as carbon dioxide, before the pressure is released and the temperature lowered to foam the granulates to foam beads. These foam beads can then be injected into a mold, before the foam beads are heat fused therein into the desired shape by the application of pressure and steam. Still another example therefore is to form expandable polymer beads by extruding a pressurized, blowing agent including polymer melt through the dies of a die plate and by granulating the polymer melt strands directly behind the dies in an underwater granulator, in which the polymer melt is cooled under pressure to avoid an expansion of the polymer strand. The expandable polymer beads can then be foamed and fused in a mold into an article having the desired shape.

SUMMARY

Recently, producing the foamed articles making use of three-dimensional (3D) printing has been proposed. This method has the advantage that no moldings, which are laborious and expensive to produce, are required. Moreover, 3D printing is fast, allows to change the material during the process and generates only very small amounts of waste.

CN 106493968 A discloses a method and an apparatus for producing a foamed product based on 3D printing. The apparatus comprises a 3D printer as molding unit, a supercritical infiltration unit and a foaming unit. While the supercritical infiltration unit comprises a preheater, a booster pump, a carbon dioxide storage tank and an infiltration vessel, the foaming unit is mainly composed of a steam generator, a foam box and a cover plate. The method comprises the following steps: firstly, printing a three-dimensional model of a polymer melt via the 3D printer; secondly, then putting the formed three-dimensional model into the infiltration vessel of the supercritical infiltration unit and infiltrating supercritical carbon dioxide and thirdly, carrying out steam foaming of the three-dimensional model in the foam box to obtain the foamed product.

It has been found that this process has several drawbacks. First the process does not allow for the production of hybrid articles comprising foamed sections and non-foamed sections. Rather, this method only allows for the production of articles, which are completely and uniformly foamed. In addition, the foam structure and the density of the foamed product produced with this method cannot be satisfyingly controlled. Furthermore, the polymer strands printed with the aforementioned method do not firmly stick together so that the formed article is not stable enough.

In view of this, the object underlying the present invention is to provide a 3D printing system and a method for preparing a three-dimensional object made at least partially of an expanded polymer, which is more flexible, which leads to a very stable object, and which particularly enables control of the foam structure and the density of the foamed product and enables the production of hybrid articles comprising foamed sections and non-foamed sections.

In accordance with embodiments of the invention, this object is satisfied by providing a three-dimensional printing system for preparing a three-dimensional object made at least partially of an expanded polymer comprising:
  i) a printing device for transporting and depositing an expanded strand of polymer including a blowing agent onto a surface and
  ii) a three-dimensional movement device for adjusting the position of the printing device in a predefined three-dimensional matrix to allow to deposit the strand of expanded polymer at a predetermined time at a precise position within the three-dimensional matrix,
wherein the printing device comprises:
a) a feed section,
b) a transporting section,
c) a surface melting section and
d) a terminal printing head section for depositing the expanded polymer strand onto the surface,
wherein all of the feed section a), the transporting section b), the surface melting section c) and the printing head section d) are tubular sections having the same inner diameter, and wherein the surface melting section c) comprises a solid-state welding element, a laser beam, a generator of hot gas or liquid and/or a generator of heat by an exothermal reaction.

The 3D printing system in accordance with embodiments of the invention does not deposit a polymer strand onto the target surface, which has subsequently to be injected with blowing agent and then foamed. Rather, the 3D printing system in accordance with embodiments of the invention deposits a strand of already foamed polymer onto the target surface. More specifically, an expanded polymer strand, such as one with an at least partially crystalline foamed core and a substantially amorphous outer layer, can be prepared for instance extrusion or coextrusion, before this expanded polymer strand can be transferred into the feed section of the printing device, transported in the printing device into the surface melting section, where the surface portion of the expanded polymer strand is molten, but not the interior thereof, and then deposited by discharging it from the printing device. The 3D printing system in accordance with embodiments of the invention allows to change the concentration of blowing agent in the expanded polymer strand and allows to change the kind of polymer fed into the printing device over the time. Based on these reasons, the 3D printing system in accordance with embodiments of the invention enables control of the foam structure and the density of the foamed product at discretion. Moreover, it allows enables production of hybrid articles comprising foamed sections and non-foamed sections, by temporarily stopping to feed into the printing device an expanded polymer strand and by replacing it with a non-expanded polymer not including any blowing agent. All in all, the present invention provides a 3D printing system and a method for preparing a three-dimensional object made at least partially of an expanded polymer, which is more flexible and which particularly enables control of the foam structure and the density of the foamed product and enables production of hybrid articles comprising foamed sections and non-foamed sections. In addition, since the surface area of the polymer strand is selectively molten immediately before depositing the expanded polymer strand through the printing head section onto the target surface, thus rendering the surface of the expanded polymer strand sticky, the deposited expanded polymer strand firmly adheres to the surface, which is the instant polymer already deposited some minutes before. Therefore, the present invention enables production of produce very stable objects made at least partially of an expanded polymer.

In accordance with embodiments of the invention, all of the feed section a), the transporting section b), the surface melting section c) and the printing head section d) are tubular sections having the same inner diameter, which is preferably between 1 and 10 mm and more preferably between 2 and 4 mm.

Also, embodiments of the present invention are not particularly limited concerning the order of the transporting section b) and the surface melting section c), as long as both are between the upstream feed section a) and the terminal downstream printing head section d). Section denotes in this context a longitudinal segment, i.e. a segment extending in the longitudinal direction of the printing device.

In accordance with one particular preferred embodiment of the present invention, the feed section a), the transporting section b), the surface melting section c) and the printing head section d) are arranged in this order from an upstream end to a downstream end of the printing device. However, it is possible to change the order of sections b) and c) so that alternatively the feed section a), the surface melting section c), the transporting section b) and the printing head section d) can be arranged in this order from an upstream end to a downstream end of the printing device.

In accordance with an alternative embodiment of the present invention, the transporting section b) and the surface melting section c) are combined into one section, i.e. the combined section can be the transporting section as well as the surface melting section. Downstream of this combined section b), c) follows then the terminal printing head section d).

In accordance with another alternative embodiment of the present invention, the feed section a), the transporting section b) and the surface melting section c) are combined to one section, which is followed by the printing head section d).

The purpose of the surface melting section c) of the printing device of the 3D printing system in accordance with embodiments of the invention is to selectively melt the surface area or surface layer, respectively, of the expanded polymer strand transported through the printing device to render it sticky, without melting the interior of the expanded polymer strand.

In accordance with a first particularly preferred embodiment of the present invention, the surface melting section c) comprises a solid-state welding element to selectively melt the surface portion of the expanded polymer strand, but not the interior thereof. For instance, the solid-state welding element can be provided on the outer wall of the tube of the surface melting section c). Any solid-state welding element can be used, such as an ultrasound generator, a microwave generator and/or an infrared generator.

In accordance with a second particularly preferred embodiment of the present invention, the surface melting section c) comprises a laser beam to selectively melt the surface portion of the expanded polymer strand, but not the interior thereof. The laser beam can be provided on or in a distance to the outer wall of the tube of the surface melting section c).

In accordance with a third particularly preferred embodiment of the present invention, the surface melting section c) comprises a generator of hot gas or liquid to selectively melt the surface portion of the expanded polymer strand, but not the interior thereof. The generator of hot gas or liquid can be provided on or in a distance to the outer wall of the tube of the surface melting section c) and can be for instance a generator of hot gas and more preferably a generator of hot air.

In accordance with a fourth particularly preferred embodiment of the present invention, the surface melting section c) comprises a generator of heat by an exothermal reaction to selectively melt the surface portion of the expanded polymer strand, but not the interior thereof. For example, the generator of heat by an exothermal reaction can be provided on or in a distance to the outer wall of the tube of the surface melting section c) and can be generator of a flame.

As set out above, the expanded polymer strand fed into the feed section of the printing device of the 3D printing system in accordance with embodiments of the invention can be prepared by extrusion or coextrusion, before the produced expanded polymer strand is transferred into the feed section of the printing device. For this purpose it is suggested in a further development of the present invention that the 3D printing system further comprises an extrusion device for extruding an expanded polymer strand, in particular for extruding an expanded polymer strand with a solid core and an outer layer having a lower melting point than the solid core so that it can be molten, without melting the solid core, and even more preferably for extruding an expanded polymer strand with an at least partially crystalline foamed core and a substantially amorphous outer layer, wherein the core and the outer layer are made of the same polymer.

In accordance with an alternative preferred embodiment of the present invention, the 3D printing system further comprises a coextrusion device for coextruding an expanded polymer strand, such as preferably an expanded polymer strand with a solid core and an outer layer having a lower melting point than the solid core so that it can be molten, without melting the solid core, and even more preferably for coextruding an expanded polymer strand with an at least partially crystalline foamed core of a first polymer and a substantially amorphous outer layer of a second polymer.

According to another aspect, embodiments of the invention relate to a method for preparing a three-dimensional object made at least partially of an expanded polymer, wherein the method is performed in the aforementioned three-dimensional printing system.

In addition, the present invention relates to a method for preparing a three-dimensional object made at least partially of an expanded polymer, wherein the method is performed in a three-dimensional printing system comprising:
  i) a printing device for transporting and depositing an expanded strand of polymer including a blowing agent onto a surface and
  ii) a three-dimensional movement device for adjusting the position of the printing device in a predefined three-dimensional matrix to allow to deposit the strand of expanded polymer at a predetermined time at a precise position within the three-dimensional matrix,
  wherein the printing device comprises:
  a) a feed section,
  b) a transporting section,
  c) a surface melting section and
  d) a terminal printing head section for depositing the expanded polymer strand onto the surface,
  wherein the method comprises the following steps:
  a) providing an expanded polymer strand with a solid core and an outer layer having a lower melting point than the solid core so that it can be molten, without melting the solid core, and preferably with an at least partially crystalline foamed core and a substantially amorphous outer layer,
  b) transferring the expanded polymer strand into the feed section of the printing device,
  c) transporting the expanded polymer strand in the printing device into the surface melting section, where the surface portion of the expanded polymer strand is molten, but not the interior thereof, and
  d) depositing the expanded, surface molten polymer strand by discharging it from the printing device.

Preferably, the expanded polymer strand provided in step a) is prepared by extruding a polymer including a blowing agent and optionally a nucleating agent into an expanded polymer strand with an at least partially crystalline foamed core and a substantially amorphous outer layer.

Alternatively, the expanded polymer strand provided in step a) can be prepared by coextruding a first polymer including a blowing agent and optionally a nucleating agent and a second polymer into an expanded polymer strand with an at least partially crystalline foamed core of the first polymer and a substantially amorphous outer layer of the second polymer.

In step c), the surface portion of the expanded polymer strand is molten in the surface melting section, but not the interior thereof. This can be achieved for instance so that the surface melting section comprises a solid-state welding element to selectively melt the surface portion of the expanded polymer strand, but not the interior thereof. For instance, the solid-state welding element can be provided on the outer wall of the tube of the surface melting section c). Any solid-state welding element can be used, such as an ultrasound generator, a microwave generator and/or an infrared generator. Alternatively, the surface melting section c) can comprise a heating element to selectively melt the surface portion of the expanded polymer strand, but not the interior thereof. For instance, the heating element can be provided on the outer wall of the tube of the surface melting section c), wherein the heating element can be an active heating element, such as a Peltier element and/or an electric resistance heater, or a heat exchanger. Still alternatively, the surface melting section c) comprises a laser beam to selectively melt the surface portion of the expanded polymer strand, but not the interior thereof. The laser beam can be provided on or in a distance to the outer wall of the tube of the surface melting section c). Still alternatively, the surface melting section c) comprises a generator of hot gas or liquid to selectively melt the surface portion of the expanded polymer strand, but not the interior thereof. The generator of hot gas or liquid can be provided on or in a distance to the outer wall of the tube of the surface melting section c) and can be for instance a generator of hot gas and more preferably a generator of hot air. Still alternatively, the surface melting section c) comprises a generator of heat by an exothermal reaction to selectively melt the surface portion of the expanded polymer strand, but not the interior thereof. For example, the generator of heat by an exothermal reaction can be provided on or in a distance to the outer wall of the tube of the surface melting section c) and can be generator of a flame.

The present invention can be performed with any foamable polymer. Suitable examples therefore are polymers being selected from the group consisting of thermoplastic polyurethanes, polyolefins (such as polyethylenes or polypropylenes), polyesters (such as polyethylene terephthalates), ethylene vinylacetate copolymers, ethylene butyl acrylate copolymers, polystyrenes, polylactic acids, thermoplastic elastomers, nitrile rubbers, copolymers of acrylonitrile and butadiene, polychloroprenes, polyimides, polyvinyl chlorides and arbitrary combinations of two or more of the aforementioned compounds.

Particular good results are obtained when the polymer is a polyethylene terephthalate.

Even if the present invention can be performed with one or more chemical blowing agents, it is particularly preferred that the blowing agent used in the method in accordance with embodiments of the invention is a physical blowing agent. Preferred examples for the physical blowing agent are those selected from the group consisting of carbon dioxide, nitrogen, water, cyclopentane, isobutane, pentane and arbitrary combinations of two or more of the aforementioned compounds.

To adjust the size of the bubbles formed by the blowing agent during the expansion, it is suggested in a further development of the idea of the present invention that the expanded polymer strand is prepared by making use of at least one nucleating agent. Good results are in particular obtained, when the nucleating agent is selected from the group consisting of talc, waxes, graphite, bentonites and arbitrary combinations of two or more of the aforementioned compounds.

In accordance with another aspect, embodiments of the invention relate to a method for preparing a three-dimensional object made at least partially of an expanded polymer, wherein the method is preferably performed in an aforementioned printing system and comprises the following steps:
a) providing an expanded polymer strand with a solid core and an outer layer having a lower melting point than the solid core so that it can be molten, without melting the solid core and preferably with an at least partially crystalline foamed core and a substantially amorphous outer layer,
b) transferring the expanded polymer strand into the feed section of a printing device,
c) transporting the expanded polymer strand in the printing device,
d) melting the surface portion of the expanded polymer strand, but not the interior thereof,
e) depositing the expanded polymer strand by discharging it from the printing device and
f) applying a glue to the surface of the expanded polymer strand.

By applying a glue to the surface of the expanded polymer strand, its surface is rendered sticky, so that subsequently deposited strand firmly adheres thereto. Due to this reason, also this embodiment of the present invention allows to produce very stable objects made at least partially of an expanded polymer.

The glue or adhesive, respectively, can be selected from a wide variety of adhesives being available on the market depending on the type of the foamed polymer that is to be bonded (e.g. based on the polarities of the material and the adhesive). Examples for suitable adhesives are synthetic adhesives, hot melt adhesives based on ethylene-vinyl-acetate, polyolefines or other thermoplastic polymers and their mixtures, reaction adhesives based on cyanoacrylates, acrylates, epoxide, polyutrethanes or others and bioadhesives based on natural polymers like lignin, starch or others more.

In accordance with a further aspect, embodiments of the invention relate to a three-dimensional object, which is obtainable with any of the two aforementioned methods. The three-dimensional object can be an acoustic insulating material, a cushioning, a mattress, a mat, a sponge, a shoe sole, a sports shoe, a protective equipment, a support structure or a filling structure.

The invention claimed is:

1. A method for preparing a three-dimensional object made at least partially of an expanded polymer, the method being performed in a three-dimensional printing system comprising:
a printing device configured to transport and deposit a strand of the expanded polymer including a blowing agent onto a surface and
a three-dimensional movement device configured to enable depositing of the strand of the expanded polymer at a predetermined time at a precise position within a three-dimensional matrix,
the printing device comprising:
a feed section,
a transporting section,
a surface melting section and
a terminal printing head section configured to deposit the strand of the expanded polymer onto the surface,
each of the feed section, the transporting section, the surface melting section, and the printing head section is a tubular section having the same inner diameter,
the surface melting section comprising a solid-state welding element, a laser beam, a generator of hot gas or liquid, or a generator of heat by an exothermal reaction,
the strand of the expanded polymer with a solid core and an outer layer having a lower melting point than the solid core so that the outer layer can be molten, without melting the solid core, is prepared by extruding a polymer including the blowing agent and a nucleating agent into the strand of the expanded polymer with an at least partially crystalline foamed core and a substantially amorphous outer layer, or is prepared by coextruding a first polymer including the blowing agent and the nucleating agent and a second polymer into the strand of the expanded polymer with an at least partially crystalline foamed core of the first polymer and a substantially amorphous outer layer of the second polymer before the strand of the expanded polymer is fed into the feed section of the printing device of the three-dimensional printing system.

* * * * *